(12) United States Patent
Park et al.

(10) Patent No.: US 11,136,001 B2
(45) Date of Patent: Oct. 5, 2021

(54) EXTERIOR CAMERA LENS CLEANING SYSTEM AND CLEANING METHOD THEREOF

(71) Applicants: Hyundai Motor Company, Seoul (KR); Kia Motors Corporation, Seoul (KR); SL Corporation, Daegu (KR)

(72) Inventors: Jong Min Park, Gyeonggi-do (KR); Nak Kyoung Kong, Gyeonggi-do (KR); Sang Hyun Jung, Incheon (KR); Ki Hong Lee, Seoul (KR); Da Sol Yu, Chungcheongnam-do (KR); Seung Hyeok Chang, Gyeonggi-do (KR); Yeong Kook Cho, Gyeongsangbuk-do (KR); Yong Hwan Kim, Gyeongsangbuk-do (KR); Won Bin Kim, Gyeongsangbuk-do (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 16/190,474

(22) Filed: Nov. 14, 2018

(65) Prior Publication Data
US 2019/0389430 A1 Dec. 26, 2019

(30) Foreign Application Priority Data
Jun. 25, 2018 (KR) ........................ 10-2018-0072938

(51) Int. Cl.
*H04N 5/225* (2006.01)
*B60S 1/04* (2006.01)
(Continued)

(52) U.S. Cl.
CPC ............ *B60S 1/0411* (2013.01); *B60R 11/04* (2013.01); *H04N 5/2252* (2013.01);
(Continued)

(58) Field of Classification Search
CPC .. B60S 1/0411; B60R 2011/004; B60R 11/04; H04N 5/23218; H04N 5/23203; H04N 5/2252
See application file for complete search history.

(56) References Cited

U.S. PATENT DOCUMENTS

2008/0055411 A1* 3/2008 Lee .......................... B60R 1/00
348/148
2017/0297535 A1* 10/2017 Zhang ..................... B60S 1/566
(Continued)

FOREIGN PATENT DOCUMENTS

KR 20070063485 A 6/2007

*Primary Examiner* — Tsion B Owens
(74) *Attorney, Agent, or Firm* — Mintz Levin Cohn Ferris Glovsky and Popeo, P.C.; Peter F. Corless

(57) ABSTRACT

An exterior camera lens cleaning system for a vehicle may include: a base unit fixed to the vehicle; a housing unit configured to be rotatable with respect to the base unit; a camera unit including a camera module, the camera unit at least partially inserted into the housing unit and configured to move in a longitudinal direction of the housing unit; a wiper disposed on an inside surface of the housing unit so as to face the camera module; and a control unit configured to receive video data through the camera module, to control a rotation operation of the housing unit based on a state of the vehicle, and to control an extension operation of the camera unit. The camera unit may be interlocked with the housing unit, and when the housing unit is rotated by the control unit, the camera unit may be configured to move horizontally in the longitudinal direction of the housing unit.

7 Claims, 11 Drawing Sheets

(51) Int. Cl.
*H04N 5/232* (2006.01)
*B60R 11/04* (2006.01)
*B60R 1/00* (2006.01)
*B60R 11/00* (2006.01)

(52) U.S. Cl.
CPC ..... *H04N 5/23203* (2013.01); *H04N 5/23218* (2018.08); *B60R 1/00* (2013.01); *B60R 2011/004* (2013.01); *B60R 2011/0084* (2013.01)

(56) References Cited

U.S. PATENT DOCUMENTS

2018/0361998 A1* 12/2018 Renaud .................. B60S 1/566
2019/0001895 A1* 1/2019 Peterson ............... B60R 1/0617
2019/0162953 A1* 5/2019 Bretagnol .......... G02B 27/0006

* cited by examiner

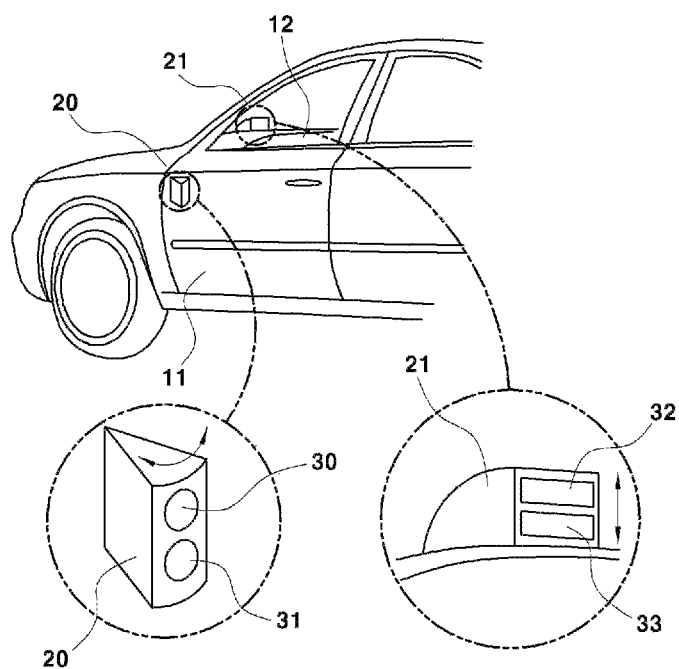
[FIG. 1]

[FIG. 2]
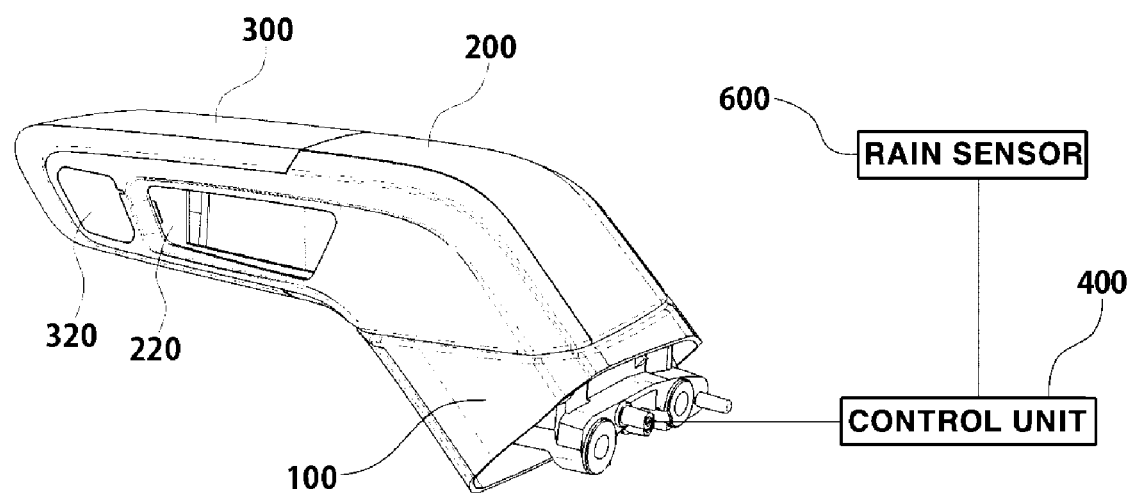

[FIG. 3]
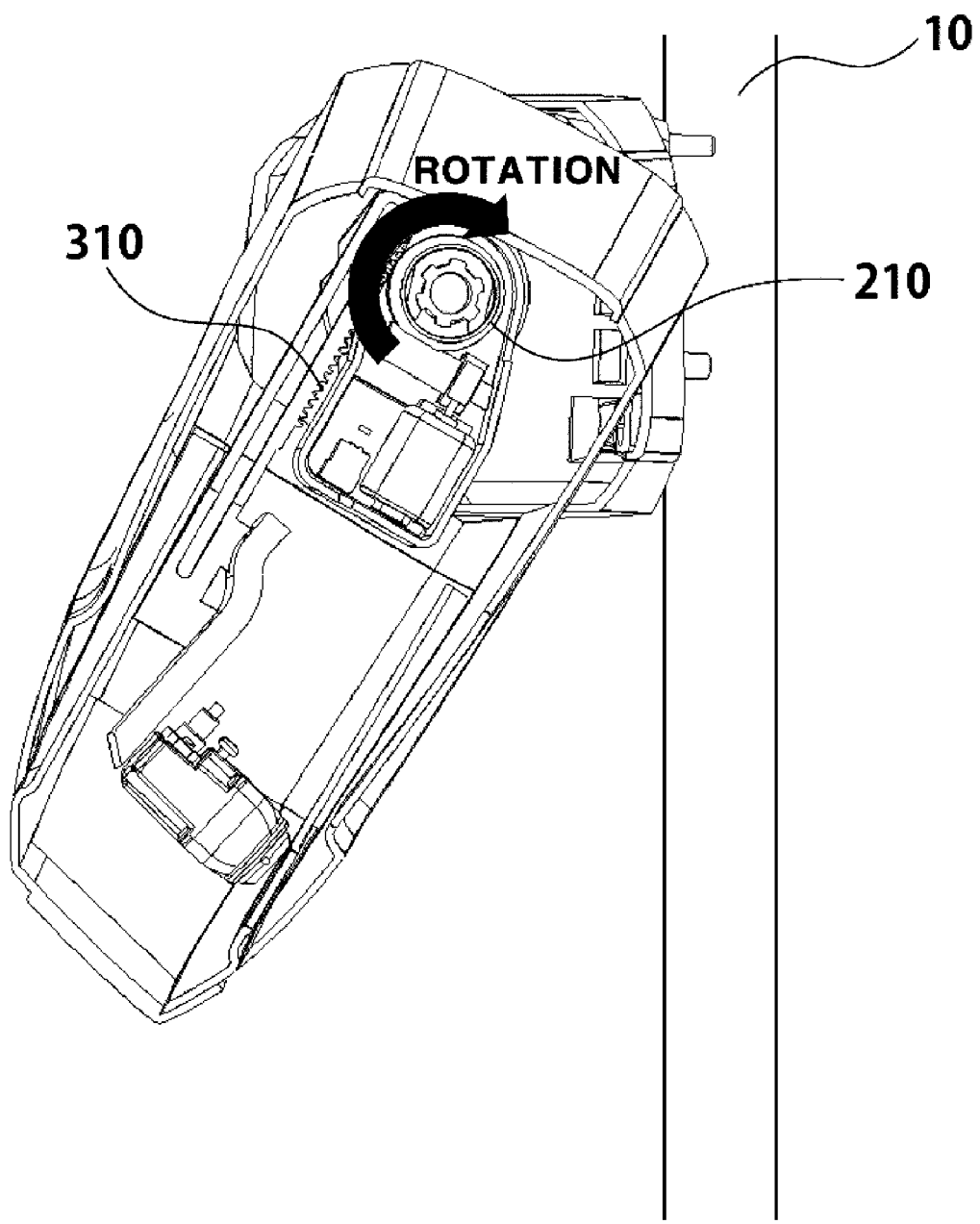

[FIG. 4]
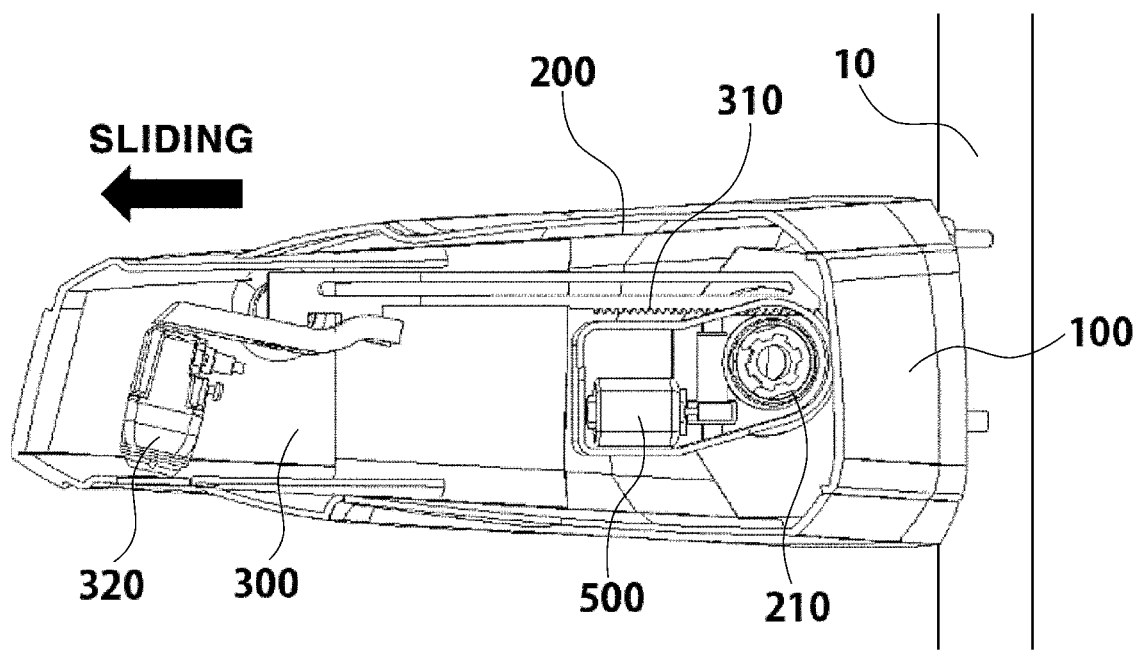

[FIG. 5]
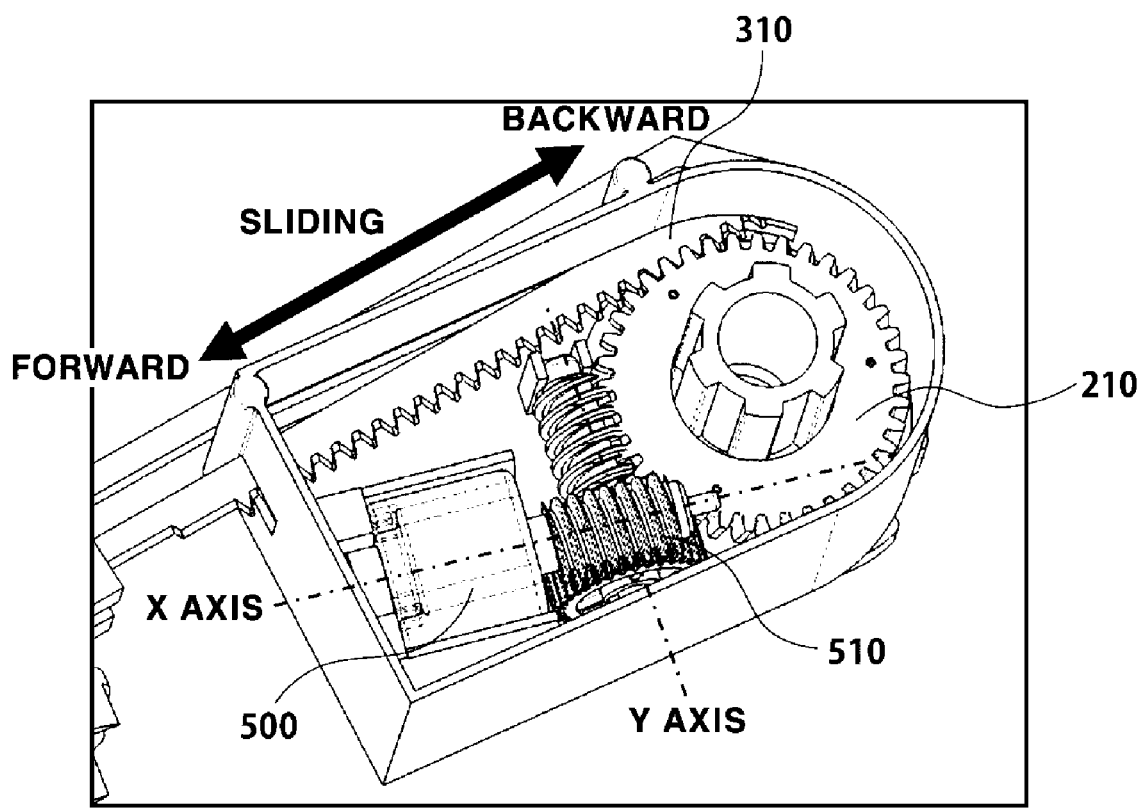

[FIG. 6A]
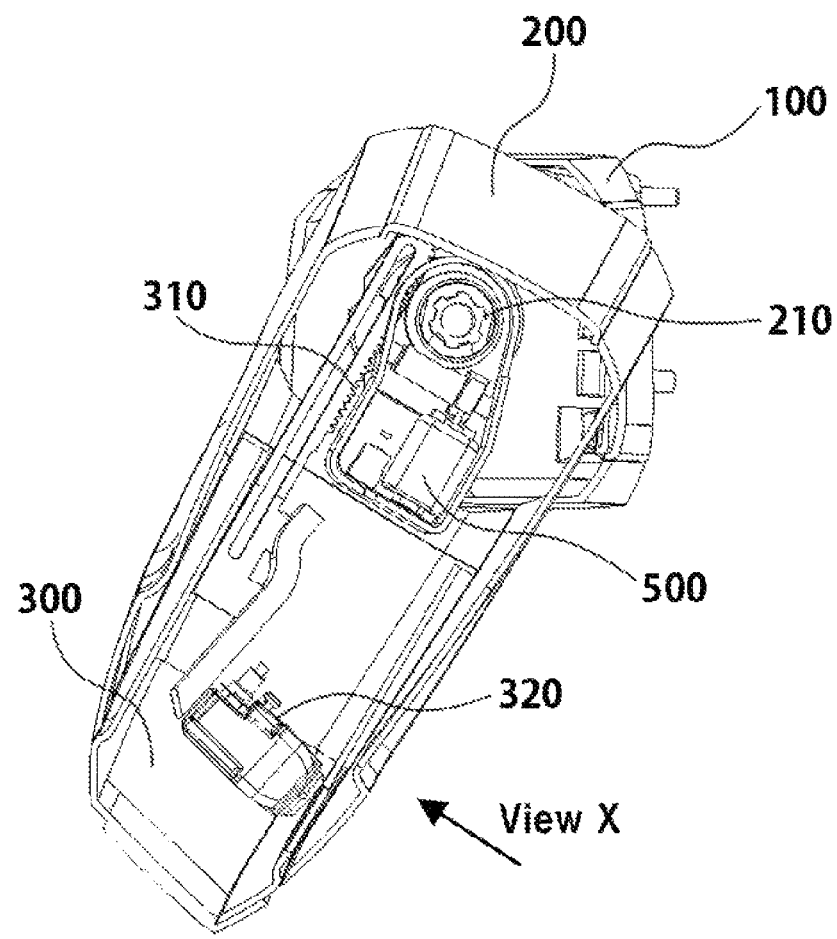

[FIG. 6B]
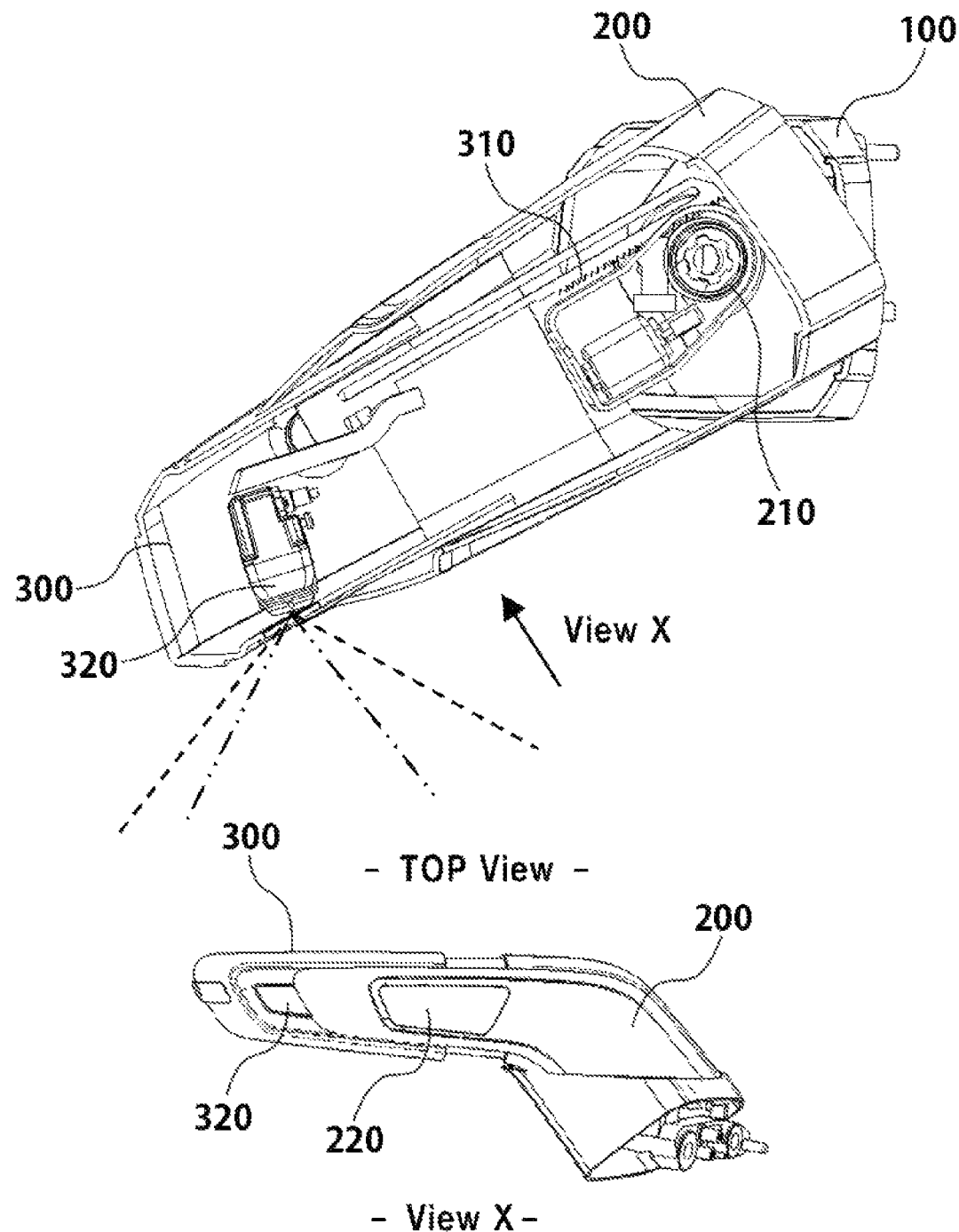

[FIG. 6C]
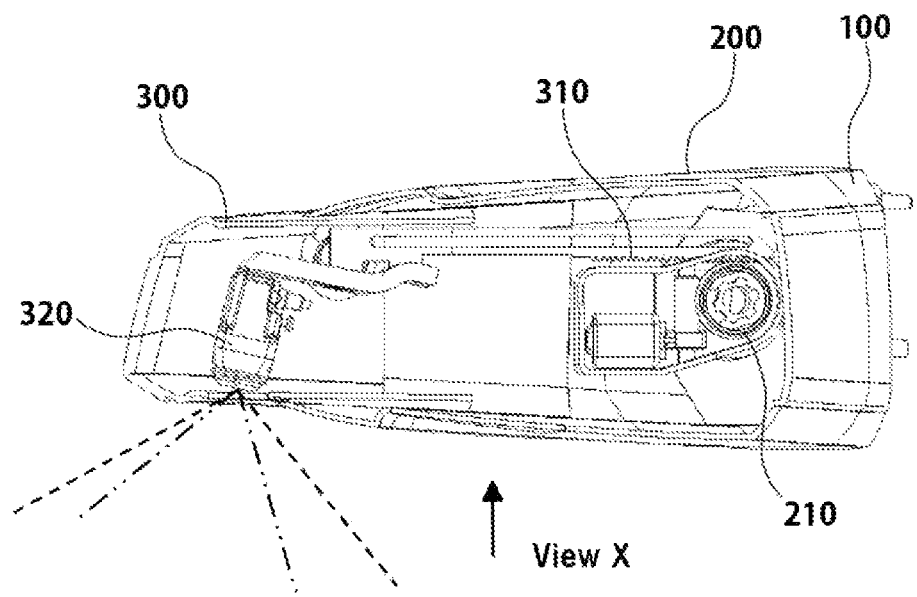
View X
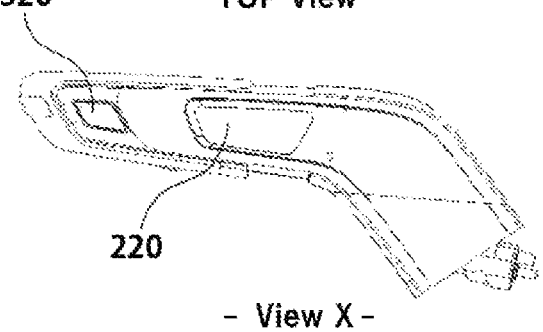
- TOP View -
- View X -

[FIG. 7]
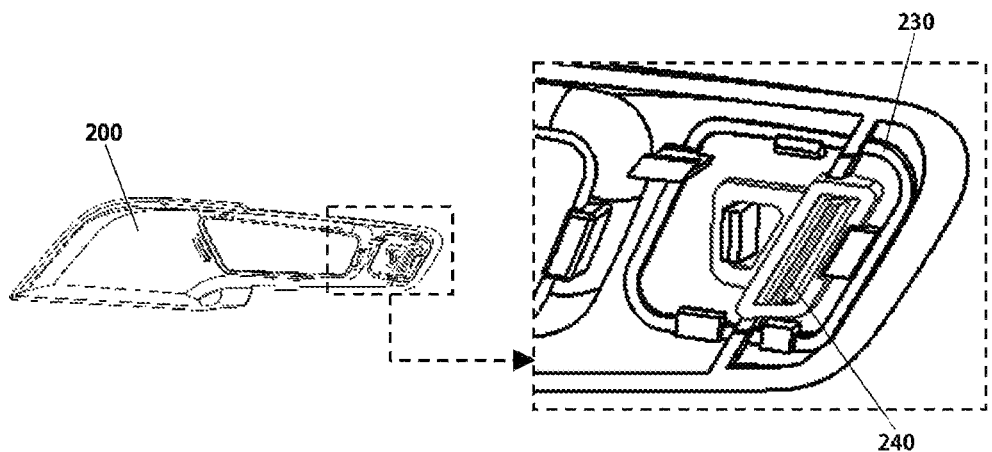
[FIG. 8]
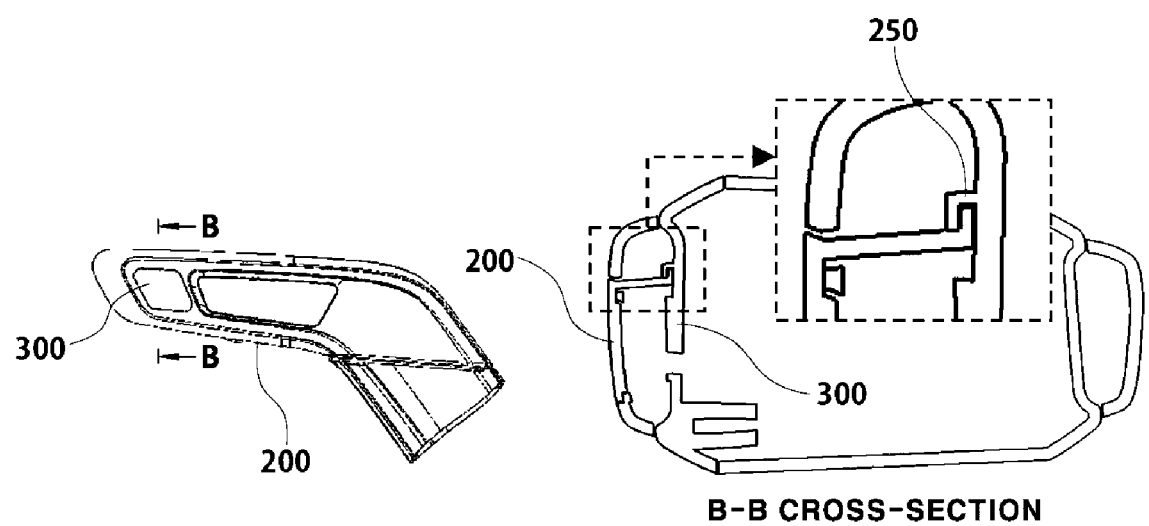
B-B CROSS-SECTION

[FIG. 9]
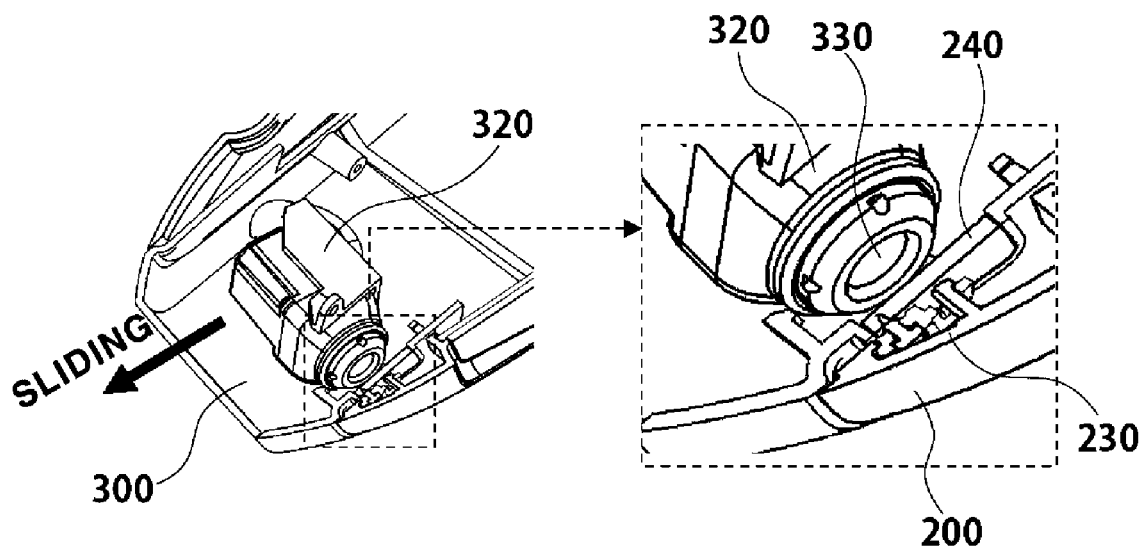

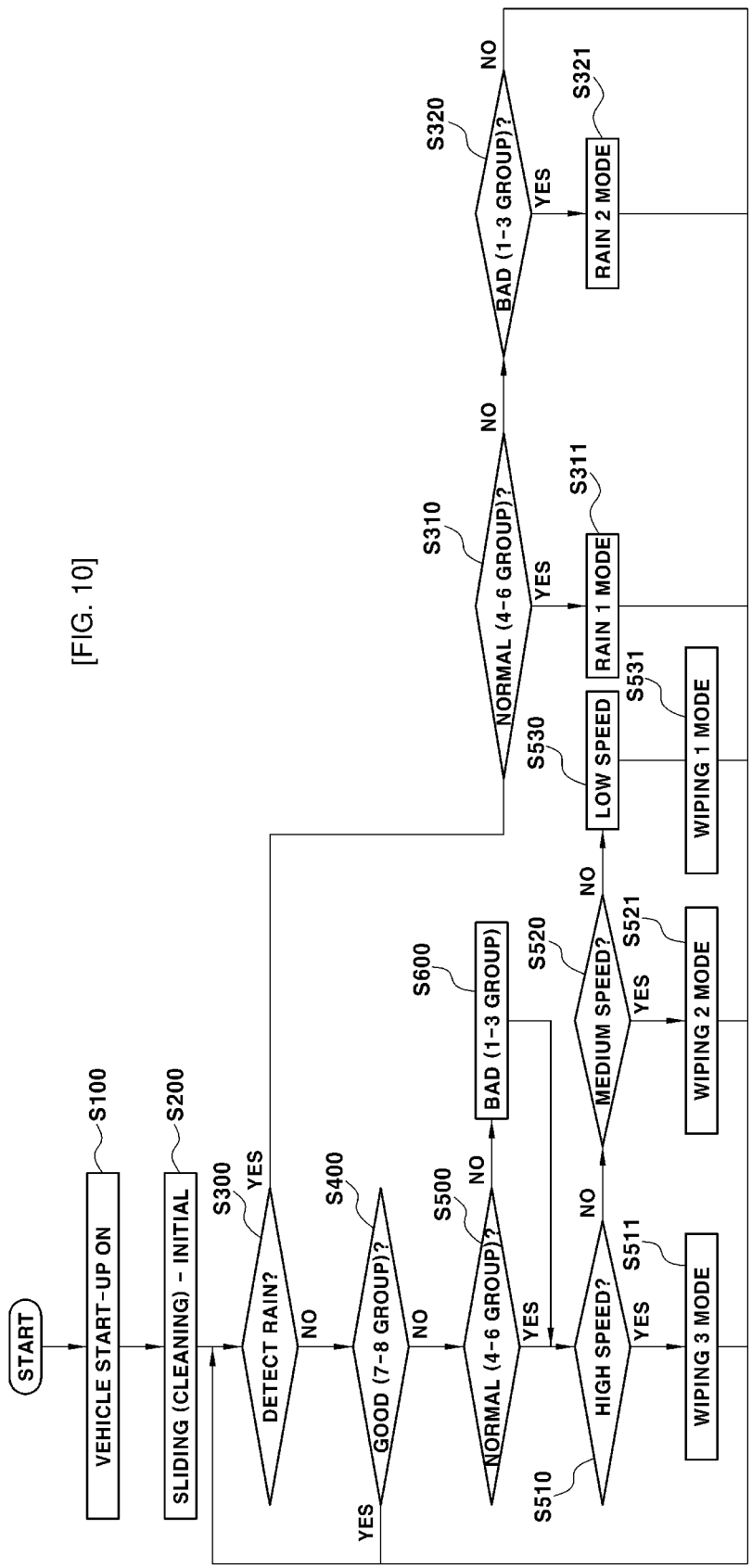

EXTERIOR CAMERA LENS CLEANING SYSTEM AND CLEANING METHOD THEREOF

CROSS-REFERENCE TO RELATED APPLICATION

This application claims under 35 U.S.C. § 119(a) the benefit of priority to Korean Patent Application No. 10-2018-0072938, filed on Jun. 25, 2018 in the Korean Intellectual Property Office, the entire contents of which are incorporated herein by reference.

BACKGROUND

(a) Technical Field

The present disclosure relates to an exterior camera lens cleaning system and a cleaning method, and more preferably, to an exterior camera lens cleaning system and a cleaning method, which is formed, as an exterior camera system including a camera module for displaying a side state of a vehicle and a wiper configuration for performing the cleaning of the lens of the camera unit.

(b) Background Art

A driver of a vehicle is generally able to change lanes while monitoring a rear-view mirror. However, the vehicle mirrors are susceptible to blind spots and can fail to show all surrounding vehicles. In addition, side mirrors mounted on the outside of the vehicle are often prone to damage by physical impact.

Recently, a Camera Mirror System (CMS) has been developed to display the external surroundings of a vehicle captured by an exterior camera lens using a screen mounted in an interior of the vehicle. For example, FIG. 1 illustrates a conventional exterior camera configuration that protrudes from the outside surface of the vehicle. As shown in FIG. 1, the exterior camera configuration includes an exterior camera 20 located at one side of a door 11 of the vehicle, and the exterior camera is configured to include a first lens 30 and a second lens 31 to be rotated toward the inside of the door.

However, it can be difficult for the driver to observe all of the side and rear views of the vehicle through the conventional exterior camera because the exterior camera protrudes only a small amount from the vehicle body. Conversely, if the exterior camera is installed to protrude from the vehicle by a certain mount, it can be practically difficult to protect the camera.

The above information disclosed in this Background section is only for enhancement of understanding of the background of the disclosure, and accordingly it can contain information that does not form the related art.

SUMMARY OF THE DISCLOSURE

The present disclosure is intended to solve the above problem. An object of the present disclosure is to provide an exterior camera lens cleaning system that protects an exterior vehicle camera, and secure a wide-angle view of the side and rear thereof.

In addition, another object of the present disclosure is to provide an exterior camera lens cleaning system that enables rotation and extension of an exterior vehicle camera in a longitudinal direction through an actuator.

In addition, another object of the present disclosure is to provide a wiper configuration located in an interior of the housing unit facing a camera module, and to provide an exterior camera lens cleaning system capable of cleaning the lens of the camera module.

The objects of the present disclosure are not limited to the above-mentioned objects, and other objects of the present disclosure which are not mentioned can be understood by the following description and can be more clearly understood by the embodiments of the present disclosure. In addition, the objects of the present disclosure can be realized by the means illustrated in the claims and their combinations.

According to embodiments of the present disclosure, an exterior camera lens cleaning system may include: a base unit fixed to the vehicle; a housing unit configured to be rotatable with respect to the base unit; a camera unit including a camera module, the camera unit at least partially inserted into the housing unit and configured to move in a longitudinal direction of the housing unit; a wiper disposed on an inside surface of the housing unit so as to face the camera module; and a control unit configured to receive video data through the camera module, to control a rotation operation of the housing unit based on a state of the vehicle, and to control an extension operation of the camera unit. The camera unit may be interlocked with the housing unit, and when the housing unit is rotated by the control unit, the camera unit may be configured to move horizontally in the longitudinal direction of the housing unit.

The housing unit housing unit may include a gear unit configured to rotate the housing unit based on an operation of an actuator.

The camera unit may further include a rack gear unit that is interlocked with the gear unit, and the rack gear unit may be configured to move the camera unit in a longitudinal direction of the camera unit when the housing unit is rotated.

The exterior camera lens cleaning system may further include a reflection unit disposed on a side surface of the housing unit where the camera module is exposed.

The exterior camera lens cleaning system may further include a housing cover cap disposed on the inside surface of the housing unit proximate to the wiper.

Each of the housing unit and the camera unit may have at least one end coupled with a rail configured to move the camera unit along the rail in the longitudinal direction of the housing unit.

The housing unit and the camera unit may be interlocked with each other, and operation of the housing unit and the camera unit may be controlled by an actuator.

The control unit may be configured to control the rotation operation of the housing unit by setting a rotation angle of the housing unit based on a speed of the vehicle.

Furthermore, according to embodiments of the present disclosure, an exterior camera lens cleaning method for a vehicle may include: determining, by a control unit, a contamination degree of a camera module of the vehicle; and performing, by the control unit, cleaning of the camera module when the contamination degree of the camera module is greater than or equal to a predetermined reference degree. The performing of the cleaning of the camera module may include controlling, by the control unit, an operation in which a camera unit is inserted into a housing unit of the vehicle and then ejected from the housing unit a particular number of times based on a state of the vehicle or a speed of the vehicle.

The determining of the contamination degree of the camera module may include: determining, by the control unit, determining the contamination degree by dividing a screen measured by the camera module into a grid unit; and measuring, by the control unit, a number of perceptible grids resulting from the divided screen.

The performing of the cleaning of the camera module may include: determining, by the control unit, the particular number of times that the camera unit is inserted into the housing unit and then ejected from the housing unit based on the speed of the vehicle.

The housing unit may be configured to have a certain folding speed when the vehicle operates in a self-driving mode.

The exterior camera lens cleaning method may further include receiving, by the control unit, an indication of an amount of precipitation on the camera module from a rain sensor.

The exterior camera lens cleaning method may further include setting, by the control unit, at least two levels of folding speed of the housing unit based on the amount of precipitation on the camera module.

Accordingly, the present disclosure provides an exterior camera lens cleaning system, and has the effect of providing clearer side and rear views.

In addition, the present disclosure provides an exterior camera that can simultaneously rotate and extend in the longitudinal direction thereof, and has the effect of protecting the exterior camera.

In addition, the present disclosure provides an exterior camera lens cleaning system that sets the rotation angle of the housing unit based on driving conditions, and has the effect of enhancing fuel efficiency by minimizing air resistance caused by the protrusion of the exterior camera.

Other aspects and embodiments of the disclosure are discussed infra.

BRIEF DESCRIPTION OF THE DRAWINGS

The above and other features of the present disclosure will now be described in detail with reference to certain embodiments thereof illustrated in the accompanying drawings which are given herein below by way of illustration only, and thus are not limitative of the present disclosure.

FIG. 1 illustrates a configuration of a conventional exterior camera protruding from the outside of a vehicle.

FIG. 2 is a block diagram of an exterior camera lens cleaning system according to embodiments of the present disclosure.

FIG. 3 illustrates the exterior camera lens cleaning system that a camera module is inserted into a housing unit according to embodiments of the present disclosure.

FIG. 4 illustrates the exterior camera lens cleaning system of the state that the camera module is extended along the housing unit.

FIG. 5 is a coupled diagram configured so that the housing unit and the camera unit are interlocked according to embodiments of the present disclosure.

FIG. 6A is a state diagram of the state that the exterior camera is inserted into the housing unit as according to embodiments of the present disclosure.

FIG. 6B is a block diagram of the exterior camera in the state that the side and rear views are according to embodiments of the present disclosure.

FIG. 6C is a block diagram of the state that the exterior camera is extended ahead as according to embodiments of the present disclosure.

FIG. 7 is a block diagram of a wiper configuration located inside the housing unit as according to embodiments of the present disclosure.

FIG. 8 is a cross-sectional diagram of the engagement relationship of the housing unit and the camera unit according to embodiments of the present disclosure.

FIG. 9 is a block diagram between the wiper and the camera module according to embodiments of the present disclosure.

FIG. 10 is a flowchart performing the cleaning of the exterior camera lens according to embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment. In the figures, reference numbers refer to the same or equivalent sections of the present disclosure throughout the several figures of the drawing.

DETAILED DESCRIPTION OF THE EMBODIMENTS

Hereinafter, embodiments of the present disclosure will be described more in detail with reference to the accompanying drawings. The embodiments of the present disclosure can be modified in various forms, and the scope of the present disclosure should not be construed as being limited to the following embodiments. This embodiment is provided to more fully explain the present disclosure to those skilled in the art.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

In addition, the terms ". . . part," ". . . unit," ". . . module," etc., which are described in the specification, mean a unit for processing at least one function or operation, which can be implemented by hardware or software, or a combination of hardware and software.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, the present disclosure relates to a Camera Monitoring System (CMS) configured to display the side and rear videos of a vehicle inside the vehicle through an exterior camera module 320 of the vehicle, and provides the technology that can simultaneously perform the rotation and extension of an exterior camera considering the driving conditions of the vehicle, the vehicle speed, etc.

In addition, the present disclosure provides a camera unit 300 that can be inserted into a housing unit 200, and provides an exterior camera lens 330 cleaning system that is located so that a lens 330 of the camera module 320 contacts a wiper 240 located inside the housing unit 200 to remove contaminants present on the lens 330.

FIG. 2 is a block diagram of the exterior camera lens 330 cleaning system of the present disclosure.

As illustrated, the exterior camera of the present disclosure is located on a fender or door of a vehicle, and is provided to be symmetrical to both side ends of the vehicle. More preferably, the exterior camera configuration of the present disclosure can be alternatively mounted on the location of the side mirror conventionally used.

The an exterior camera lens cleaning system is configured to include a base unit 100 fixed to the outside of the vehicle, the housing unit 200 configured to be rotatable with respect to the base unit 100, and the camera unit 300 configured to be inserted into the housing unit 200 and to horizontally move in the longitudinal direction of the housing unit 200 depending upon certain conditions.

The end of the camera unit 300 is provided with the camera module 320, and when the camera unit 300 is inserted into the housing unit 200 depending upon the driving conditions of the vehicle and the vehicle speed, the camera module 320 is configured to be not exposed to the outside.

In addition, the present disclosure is configured to include a reflection unit 220 so that the camera module 320 can identify the side and rear of the vehicle under the unexposed situation (e.g., operational fail of the exterior camera lens cleaning system), and the reflection unit 220 is configured to be located on the side surface of the housing unit 200 that the camera module 320 is exposed.

In addition, when the housing unit 200 rotates with respect to the base unit 100, the camera unit 300 is configured to move in the horizontal direction depending upon the rotation of the housing unit 200.

More preferably, when the housing unit 200 rotates in the direction away from the vehicle, the camera unit 300 performs the horizontal movement in the direction away from the housing unit 200, and when the housing unit 200 rotates in the direction closer to the vehicle, the camera unit 300 is moved to be inserted into the housing unit 200.

In addition, the housing unit 200 and the camera unit 300 are configured to be interlocked by one driving force. Therefore, the rotation motion of the housing unit 200 and the straight motion of the camera unit 300 are simultaneously performed by one actuator 500 connected by a plurality of gears.

FIG. 3 is a block diagram when the housing unit 200 is located on the location closest to the vehicle according to embodiments of the present disclosure.

As illustrated, the exterior camera of the present disclosure is configured so that the housing unit 200 is folded to the location closest to the vehicle upon the vehicle stop. In the exterior camera folded to the location closest to the vehicle, the camera unit 300 is configured to be inserted into the housing unit 200 not to expose the camera module 320 to the outside.

More preferably, a control unit 400 of the vehicle recognizes the stop state of the vehicle by sensors and rotates a gear unit 210 of the housing unit 200, and the housing unit 200 becomes the folded state by the rotated gear unit 210. In addition, a rack gear unit 310 configured to be interlocked with the gear unit 210 fixed to the housing unit 200 moves in the direction that is inserted into the housing unit 200, and the camera unit 300 moving integrally with the rack gear unit 310 is configured to have at least part inserted into the housing unit 200.

FIG. 4 illustrates a configuration of the exterior camera that is rotated under the condition of the vehicle driving (including low-speed driving, reverse driving, and self-driving) according to embodiments of the present disclosure.

As illustrated, the exterior camera of the present disclosure is configured so that the camera unit 300 performs the horizontal movement in the direction away from the vehicle in order to expose the camera module 320 to the outside upon the vehicle driving.

According to embodiments of the present disclosure, the driving force is applied so that the housing unit 200 can be rotated and simultaneously, the camera unit 300 can perform the horizontal directional motion through one actuator 500, and as illustrated in FIG. 5 below, the exterior camera lens cleaning system includes the gear unit 210 for rotating the housing unit 200, and the rack gear unit 310 configured to be interlocked with the gear unit 210 and formed to move the camera unit 300.

Accordingly, the gear unit 210 performs rotational movement depending upon the operation of the actuator 500, and the rack gear unit 310 engaged with the gear unit 210 is configured to move in the horizontal direction thereof, and to simultaneously perform the rotation motion of the housing unit 200 and the horizontal motion of the camera unit 300.

As illustrated in FIGS. 3 and 4, the present disclosure is configured to adjust the rotation angle of the exterior camera depending upon driving conditions of the vehicle and to control the exposure of the camera module 320, and is configured to clean the camera module 320 using the wiper 240 located inside the housing unit 200 when contamination is present in the camera module 320.

That is, when the camera unit 300 is inserted into and protruding from the housing unit 200, the wiper 240 is configured to face the camera module 320 on the inside surface of the housing unit 200 to remove the contamination of the camera module 320.

FIG. 5 illustrates the engagement of the gear unit 210 of the housing unit 200 and the rack gear unit 310 of the camera unit 300 according to embodiments of the present disclosure.

As illustrated, a motor can be implemented as actuator 500, and one end of the motor is configured to be connected with a worm gear 510 and the worm gear 510 is configured to be engaged with the gear unit 210.

That is, when the motor rotates around the X-axis, the worm gear 510 is configured to be interlocked with the gear unit 210 to rotate around the Y-axis. In addition, the rack gear unit 310 gear-engaged with the gear unit 210 is configured to move in the horizontal direction opposite to the rotation direction of the gear unit 210.

Accordingly, the housing unit 200 in which the gear unit 210 is fixedly located is configured to rotate, and the camera unit 300 having at least one end inserted therein is configured to horizontally move in the longitudinal direction of the housing unit 200.

FIGS. 6A to 6C illustrate the rotation state of the exterior camera depending upon the driving conditions of the vehicle according to embodiments of the present disclosure.

Firstly, FIG. 6A illustrates the state where the exterior camera is folded depending upon the stop state of the vehicle or a user's request. As illustrated, the exterior camera is rotated and located on the closest location to a vehicle body 10, and the camera unit 300 is configured to be inserted into the housing unit 200 at the location where the camera module 320 is not exposed to the outside.

Unlike the above, FIG. 6B illustrates the location of the exterior camera when the vehicle drives at a certain speed or more.

As illustrated, the housing unit 200 is configured to rotate by a set angle in the width direction of the vehicle at a certain speed or more of the vehicle, and the camera module 320 of the camera unit 300 is configured to be protruded to the outside of the housing unit 200 in order to be exposed to the outside.

according to embodiments of the present disclosure, the camera module 320 can be composed of a super wide angle camera, and more preferably, can be configured to include the super wide angle camera having an angle of view of 180° or more.

As described above, FIG. 6B illustrates the exterior camera located in the vehicle that is driving at a certain speed or more, and in the exterior camera, the housing unit 200 is configured not to exceed an angle of maximum 160° based on the width direction of the vehicle body 10 considering air resistance.

In FIG. 6C, the housing unit 200 is configured to maintain the maximum opening state upon the reverse parking or low-speed driving of the vehicle, and the present disclosure is configured to maintain the location that is in parallel with the width direction of the vehicle by rotating by 180° that is the maximum opening angle.

In addition, FIGS. 6A to 6C can be configured so that the focus of the camera module 320 has different angles. However, the control unit 400 is configured to correct the video photographed by the super wide angle camera of 180° or more, and can display the same side surface video regardless of the rotation angle of the housing unit 200.

More preferably, when driving at a certain speed or more, the video photographed through the camera module 320 can provide a narrower angle of view than the video photographed upon the low-speed driving (i.e., less than a certain speed) or the reverse parking.

FIG. 7 illustrates the inside surface of the housing unit 200 where the wiper 240 is located as an embodiment of the present disclosure.

As illustrated, it includes the wiper 240 that is configured on the location facing the camera module 320 inside the housing unit 200, and the wiper 240 is configured on a housing cover cap 230 to be separable from the housing unit 200.

The wiper 240 can be configured on the location facing the lens 330 of the camera module 320, and when the camera unit 300 is inserted into or ejected from the inside surface of the housing unit 200, it is configured to clean the lens 330 of the camera module 320.

More preferably, in an embodiment of the present disclosure, the control unit 400 is configured to divide the section into a plurality of grids in order to measure the contamination of the lens 330, and to measure the number of contaminants in the divided grids to measure the contamination degree of the camera module 320.

When the thus measured contamination degree of the camera module 320 is equal to or greater than a reference value that is set in the control unit 400, the wiper 240 is configured to perform the cleaning of the camera module 320 and the camera unit 300 is configured to be inserted into and ejected from the housing unit 200.

More preferably, the control unit 400 of the present disclosure is configured to measure the contamination degree of the camera module 320 depending upon the conditions that the camera module 320 is exposed to the outside, and is configured to control the operation of the exterior camera at the cleaning speeds in at least three levels depending upon the measured contamination degree.

In addition, the control unit 400 of the present disclosure is configured to measure the amount of precipitation in a rain sensor 600 on the condition of driving in the rain, and when a predetermined amount of precipitation or more is measured, it is configured to perform at least one cleaning control logic.

As described above, the control unit 400 is configured to control the operation speed of the camera unit 300 by interlocking with the amount of the measured precipitation in the rain sensor 600.

In summary, the exterior camera cleaning system according to embodiments of the present disclosure performs a cleaning control considering all of the vehicle speed, the driving environment of the vehicle, and the contamination degree of the camera module 320.

FIG. 8 is a side cross-sectional diagram illustrating the coupled relationship between the housing unit 200 and the camera unit 300 according to embodiments of the present disclosure.

As illustrated, the camera unit 300 coupled to the inside of the housing unit 200 is illustrated, and at least one ends of the housing unit 200 and the camera unit 300 are configured to be coupled with a rail 250.

FIG. 8 illustrates the rail 250 located on one end of the camera unit 300, and the camera unit 300 is configured to include one end having the '[' shape as the rail 250, and one end of the housing unit 200 constitutes the ']' shape in order to be engaged to the rail 250 having the '[' shape.

The housing unit 200 and the camera unit 300 thus engaged to the rail 250 guide the camera unit 300 when moving in the longitudinal direction of the housing unit 200.

More preferably, the configuration of the rail 250 can be configured to be located on a part of the housing unit 200 in the longitudinal direction thereof, and when the camera unit 300 is located in the maximum opening state, the coupling of the rail 250 between the housing unit 200 and the camera unit 300 can be released, such that the camera unit 300 can be easily dissembled from the housing unit 200.

FIG. 9 illustrates the coupled relationship for performing the cleaning of the camera module 320 according to embodiments of the present disclosure.

As illustrated, the wiper 240 of the present disclosure is configured to be located on the inside surface of the housing unit 200, and includes the housing cover cap 230 configured to be detach able to the housing unit 200. In an embodiment of the present disclosure, the housing cover cap 230 is configured to be snap-fitted to the housing unit 200.

More preferably, the wiper 240 is configured to be inserted into a groove part located on the housing cover cap 230 and formed to selectively replace it.

The wiper 240 is fixed to the location facing the camera module 320, and when the camera unit 300 is slid in the longitudinal direction of the housing unit 200, it is configured to contact the lens 330 of the camera module 320 to remove the contaminants attached to the lens 330.

More preferably, the control unit 400 can be configured to determine the contamination degree of the camera module 320, and can divide the lens 330 into grids to measure the number of grids where contamination is perceived and perform the cleaning operation using the wiper 240 depending upon the number of the measured grids.

In one example, the contamination degree may be divided into eight levels based on the brightness measured in each grid, and classified into three groups to perform the cleaning the camera module 320 based on the measured contamination degree.

In addition, in another example, the control unit 400 can be configured to adjust the cleaning speed based on the driving conditions of the vehicle depending upon a group having a high degree of contamination. In yet another example, the control unit 400 can be configured to interlock with the rain sensor 600 to adjust the cleaning speed depending upon the amount of precipitation.

The control unit 400 of the present disclosure is configured to perform the cleaning of the camera module 320 based on the above-mentioned conditions, and is configured to control the speed and the number of times that the camera unit 300 is inserted into and ejected from the housing unit 200.

FIG. 10 is a flowchart illustrating a method for cleaning the exterior camera lens 330 according to embodiments of the present disclosure.

As illustrated, the camera unit 300 is initially configured to be protruded to the outside of the housing unit 200 in the state that the start-up of the vehicle is ON S100, and the camera unit 300, which has been initially moved, is configured to move while contacting the wiper 240 inside the housing unit 200 S200.

In the vehicle driving, the control unit 400 considers current driving conditions of the vehicle, and in an embodiment of the present disclosure, is configured to measure precipitation conditions S300.

When the amount of precipitation measured in the rain sensor 600 located in the vehicle is equal to or greater than a predetermined value, the contamination degree of the camera module 320 is determined, and the cleaning using the wiper 240 is performed based on the performed determination of the contamination degree S310, S320.

More preferably, the lens 330 of the camera module 320 may be divided into a grid format, and the control unit 400 is configured to determine the contamination degree (brightness, for example) of each of the divided grids to classify the contamination of the camera module 320 into eight levels to perform the cleaning at a cycle of once per second in the 4-6 Group having a low contamination degree (a "Rain 1" mode) S311.

In contrast, in the 1-3 Group having a high contamination degree of the camera module 320, it is controlled to perform the cleaning of the lens 330 at three times per second (a "Rain 2" mode) S321. However, the number of times performing the cleaning is determined by a user's setting depending upon the contamination degree.

When it is determined that there is no precipitation in the measuring of the precipitation amount through the rain sensor 600 S300, the control unit 400 of the present disclosure divides the lens 330 of the camera module 320 into a grid format, and determines the contamination degree (brightness, for example) of each of the divided grids to classify the contamination of the camera module 320 into eight levels.

The logic is terminated in the 7-8 Group having a low contamination degree S400, and when it is not the 7-8 Group having the low contamination degree, it is determined whether or not the contamination degree is the 4-6 Group S500.

When the contamination degree is the 4-6 Group, the cleaning is performed at high speed S510 in a wiping 3 mode S511 depending upon the vehicle speed; when the vehicle speed is a medium speed S520, the cleaning is performed in a wiping 2 mode S521; and when the vehicle speed is a low speed S530, the cleaning is performed in a wiping 1 mode S531.

In an embodiment of the present disclosure, the wiping 1 mode is configured to perform the cleaning with one cycle per second, the wiping 2 mode to perform the cleaning with two cycles per second, and the wiping 3 mode to perform the cleaning with three cycles per second.

In addition, when the contamination degree is the 4-6 Group, it is set to perform the cleaning at different cycles based on the driving speed of the vehicle, and when a high speed is equal to or greater than 60 KM/H per hour and a medium speed is 30 KM/H to 60 KM/H, a low speed can be set to be less than 30 KM/H per hour.

When the contamination degree is not the 4-6 Group and the contamination degree is the 1-3 Group S600, it is configured to perform the cleaning depending upon the wiping 1 mode to the wiping 3 mode considering the vehicle speed S511, S521, S531.

However, the driving speed setting value of the vehicle in the contamination degree in the 1-3 Group S600 is configured to be lower than that in the contamination degree in the 4-6 Group, and a high speed can be set to be equal to or greater than 50 KM/H per hour, a medium speed to be 20 KM/H to 50 KM/H per hour, and a low speed to be less than 20 KM/H per hour.

As described above, the present disclosure is configured to measure the contamination degree in eight levels, and to set the horizontal directional movement cycle of the camera unit 300 depending upon the measured contamination degree, and can set the number of times of the cleaning that the camera unit 300 is inserted into and protruded from the housing unit 200.

In addition, the control unit 400 can be configured to determine whether or not it is the self-driving vehicle, and to set a certain cleaning cycle when performing the self-driving.

In summary, the present disclosure has a configuration for measuring the contamination degree of the camera module 320 and controlling the cleaning cycle considering the vehicle speed, thus enhancing the viewing performance of the exterior camera.

The foregoing description illustrates embodiments the present disclosure. In addition, the foregoing description shows and explains only certain embodiments of the present disclosure, and the present disclosure can be used in various other combinations, modifications, and environments. That is, changes and modifications thereof can be made within the scope of the inventive concept as disclosed in the present specification, the disclosed descriptions and equivalent scopes thereof, and/or the skill or knowledge of the related art.

The embodiments described above are intended to explain best modes for implementing the technical spirit of the present disclosure, and various modifications required by the specific applications or uses of the present disclosure can be made. Accordingly, the description is not intended to limit the present disclosure to the embodiments disclosed herein. In addition, it is intended that the appended claims be construed to include alternative embodiments.

What is claimed is:

1. An exterior camera lens cleaning system for a vehicle, comprising:
   a base unit fixed to the vehicle;
   a housing unit configured to be rotatable with respect to the base unit;
   a camera unit including a camera module, the camera unit at least partially inserted into the housing unit and configured to move in a longitudinal direction of the housing unit;
   a wiper disposed on an inside surface of the housing unit so as to face the camera module; and
   a control unit configured to receive video data through the camera module, to control a rotation operation of the housing unit based on a state of the vehicle, and to control an extension operation of the camera unit, wherein the camera unit is interlocked with the housing unit, and when the housing unit is rotated by the control unit, the camera unit is configured to move horizontally in the longitudinal direction of the housing unit; and
   an actuator configured to simultaneously rotate the housing unit in a direction away from the vehicle and extend the camera unit horizontally in the longitudinal direction away from the housing unit,
   wherein the camera unit is configured to move along the housing unit in the longitudinal direction of the housing unit such that the wiper contacts a lens of the camera module to remove contaminants from the lens.

2. The exterior camera lens cleaning system of claim 1, wherein the housing unit includes a gear unit configured to rotate the housing unit based on an operation of an actuator.

3. The exterior camera lens cleaning system of claim 2, wherein the camera unit further includes a rack gear unit that is interlocked with the gear unit, the rack gear unit configured to move the camera unit in a longitudinal direction of the camera unit when the housing unit is rotated.

4. The exterior camera lens cleaning system of claim 1, further comprising a reflection unit disposed on a side surface of the housing unit where the camera module is exposed.

5. The exterior camera lens cleaning system of claim 1, further comprising a housing cover cap disposed on the inside surface of the housing unit proximate to the wiper.

6. The exterior camera lens cleaning system of claim 1, wherein each of the housing unit and the camera unit has at least one end coupled with a rail configured to move the camera unit along the rail in the longitudinal direction of the housing unit.

7. The exterior camera lens cleaning system of claim 1, wherein the control unit is configured to control the rotation operation of the housing unit by setting a rotation angle of the housing unit based on a speed of the vehicle.

* * * * *